(12) United States Patent
Modave et al.

(10) Patent No.: US 8,566,931 B2
(45) Date of Patent: Oct. 22, 2013

(54) PROTECTION OF INFORMATION CONTAINED IN AN ELECTRONIC CIRCUIT

(75) Inventors: Jean-Louis Modave, Ottignies (BE); Thierry Huque, Ramillies (BE)

(73) Assignee: Proton World International N.V., Zaventem (BE)

( * ) Notice: Subject to any disclaimer, the term of this patent is extended or adjusted under 35 U.S.C. 154(b) by 101 days.

(21) Appl. No.: 12/521,772

(22) PCT Filed: Jan. 4, 2008

(86) PCT No.: PCT/EP2008/050072
§ 371 (c)(1),
(2), (4) Date: Sep. 28, 2010

(87) PCT Pub. No.: WO2008/084016
PCT Pub. Date: Jul. 17, 2008

(65) Prior Publication Data
US 2011/0010775 A1     Jan. 13, 2011

(30) Foreign Application Priority Data
Jan. 5, 2007   (FR) ..................... 07 52551

(51) Int. Cl.
*G06F 11/30* (2006.01)
*G11C 11/34* (2006.01)
*G06K 7/00* (2006.01)

(52) U.S. Cl.
USPC ......... 726/22; 365/185.04; 235/439; 235/492

(58) Field of Classification Search
None
See application file for complete search history.

(56) References Cited

U.S. PATENT DOCUMENTS

| | | | | |
|---|---|---|---|---|
| 3,906,460 A | * | 9/1975 | Halpern | 711/115 |
| 4,028,733 A | | 6/1977 | Ulicki | |
| 4,211,919 A | * | 7/1980 | Ugon | 235/487 |
| 4,484,067 A | * | 11/1984 | Obrecht | 235/380 |
| 4,734,568 A | * | 3/1988 | Watanabe | 235/487 |
| 4,983,816 A | * | 1/1991 | Iijima | 235/379 |
| 5,465,349 A | * | 11/1995 | Geronimi et al. | 714/30 |
| 5,652,729 A | * | 7/1997 | Iwata et al. | 365/222 |
| 6,188,309 B1 | | 2/2001 | Levine | |
| 6,356,126 B1 | | 3/2002 | Anderson et al. | |
| 7,036,018 B2 | * | 4/2006 | Horvat et al. | 713/189 |
| 7,258,271 B2 | * | 8/2007 | Vidal | 235/380 |
| 7,330,979 B1 | * | 2/2008 | Hazard | 713/193 |

(Continued)

FOREIGN PATENT DOCUMENTS

| | | |
|---|---|---|
| WO | WO 9829813 A | 7/1998 |
| WO | WO 99/56253 A | 11/1999 |
| WO | WO 2004/029873 A1 | 4/2004 |

OTHER PUBLICATIONS

International Search Report dated Apr. 15, 2008, from corresponding International Application No. PCT/EP2008/050072.

(Continued)

*Primary Examiner* — Christopher Revak
(74) *Attorney, Agent, or Firm* — Wolf, Greenfield & Sacks, P.C.

(57) ABSTRACT

A method and a circuit for protecting data contained in an electronic circuit against a disturbance of its operation, in which a detection of a disturbance conditions the incrementing or the decrementing of a counter over at least one bit, the counter being automatically reset at the end of a time period independent from the fact that the circuit is or not powered.

23 Claims, 7 Drawing Sheets

(56) References Cited

U.S. PATENT DOCUMENTS

| | | | |
|---|---|---|---|
| 7,496,738 B2 * | 2/2009 | Modave | 712/227 |
| 7,516,902 B2 * | 4/2009 | Modave | 235/492 |
| 7,660,169 B2 * | 2/2010 | Otterstedt et al. | 365/191 |
| 7,739,520 B2 * | 6/2010 | Horvat et al. | 713/194 |
| 7,962,760 B2 * | 6/2011 | Ferren et al. | 713/189 |
| 8,036,020 B2 | 10/2011 | La Rosa | |
| 8,122,079 B2 * | 2/2012 | Van Assche et al. | 708/672 |
| 8,411,504 B2 * | 4/2013 | Modave et al. | 365/185.04 |
| 2001/0010331 A1 * | 8/2001 | Hazard | 235/380 |
| 2003/0005315 A1 | 1/2003 | Horvat et al. | |
| 2004/0078589 A1 * | 4/2004 | Giraud | 713/200 |
| 2005/0135411 A1 | 6/2005 | Sureaud | |
| 2006/0112436 A1 | 5/2006 | Modave | |
| 2007/0220603 A1 * | 9/2007 | Chamberot | 726/22 |
| 2010/0020648 A1 | 1/2010 | La Rosa | |
| 2010/0027334 A1 | 2/2010 | La Rosa | |
| 2010/0054024 A1 | 3/2010 | La Rosa | |
| 2010/0054038 A1 | 3/2010 | La Rosa | |
| 2011/0007567 A1 | 1/2011 | Modave et al. | |
| 2011/0122694 A1 | 5/2011 | Modave et al. | |
| 2012/0206152 A1 * | 8/2012 | Naruse et al. | 324/557 |
| 2012/0206153 A1 * | 8/2012 | Naruse et al. | 324/557 |

OTHER PUBLICATIONS

International Search Report dated Apr. 14, 2008, from International Application No. PCT/EP2008/050073.

International Search Report dated Apr. 14, 2008, from International Application No. PCT/EP2008/050074.

English Translation of Written Opinion of the International Searching Authority from International Application No. PCT/EP2008/050073.

English Translation of Written Opinion of the International Searching Authority from International Application No. PCT/EP2008/050074.

English Translation of Written Opinion of the International Searching Authority from International Application No. PCT/EP2008/050072.

* cited by examiner

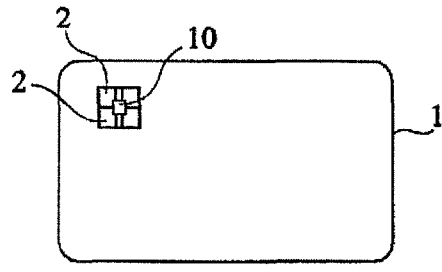
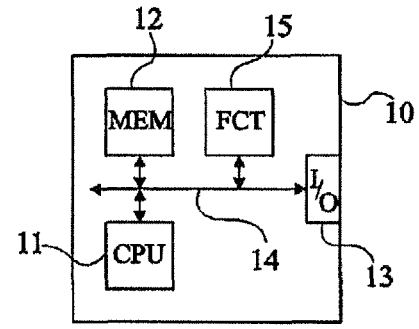
Fig 1
Prior Art
Fig 2
Prior Art
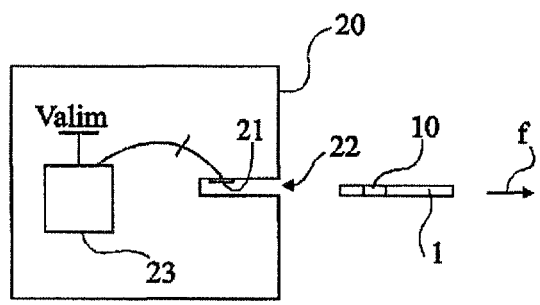
Fig 3
Prior Art
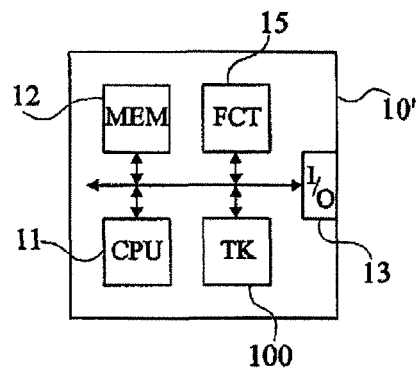
Fig 4

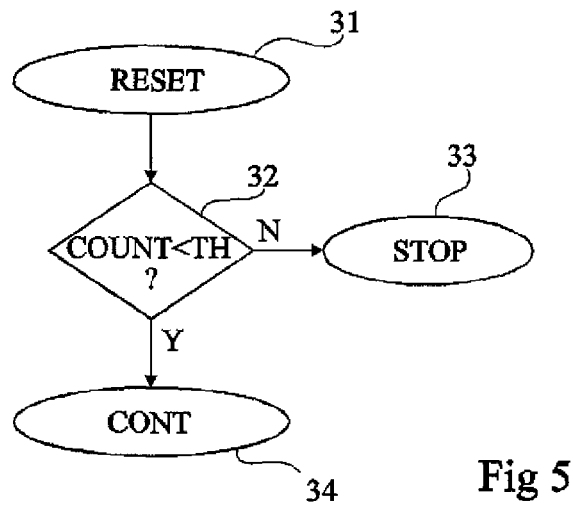
Fig 5
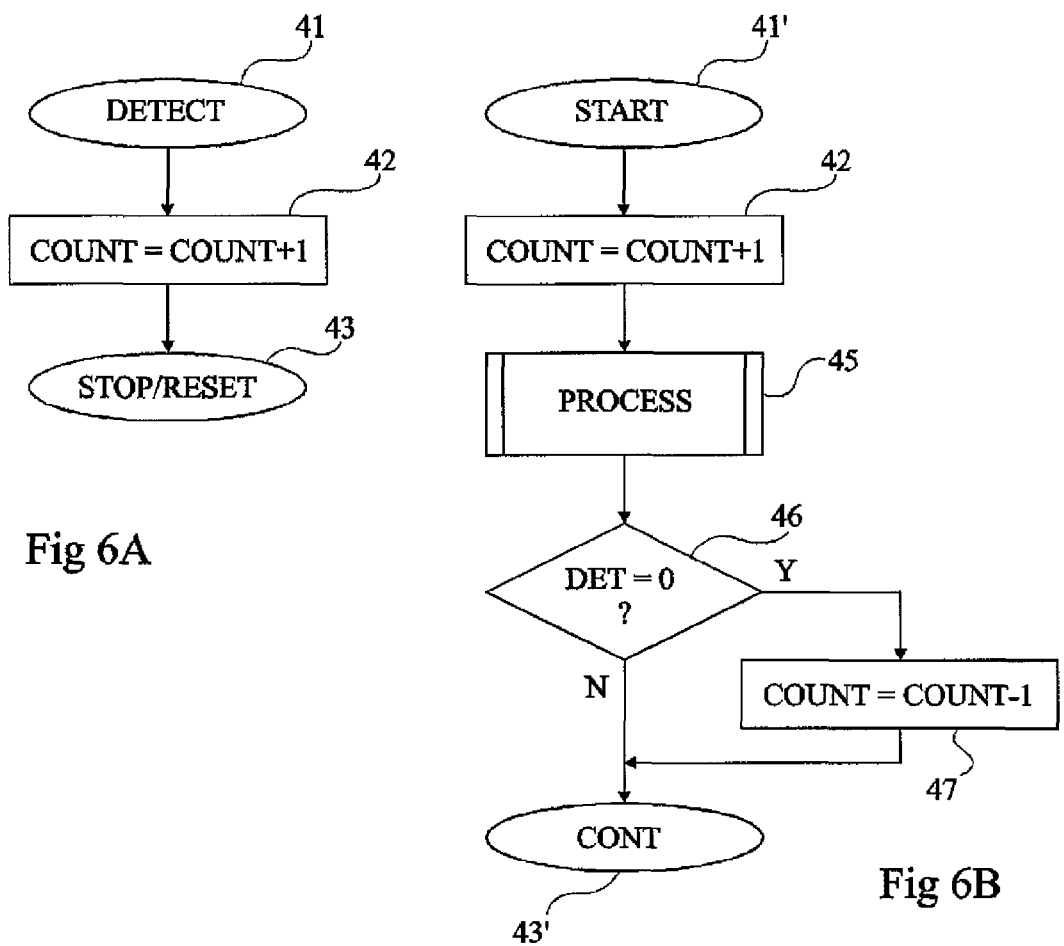
Fig 6A
Fig 6B

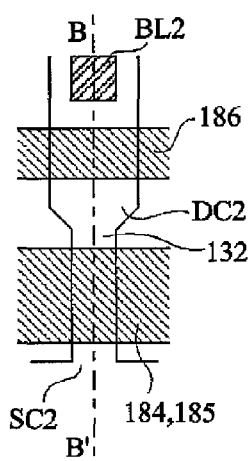 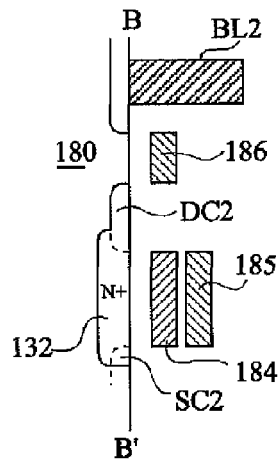 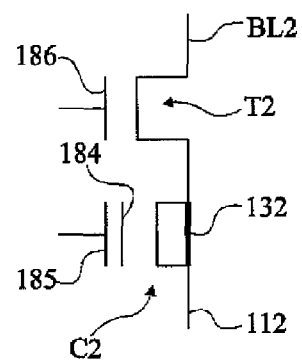
Fig 14A     Fig 14B     Fig 14C
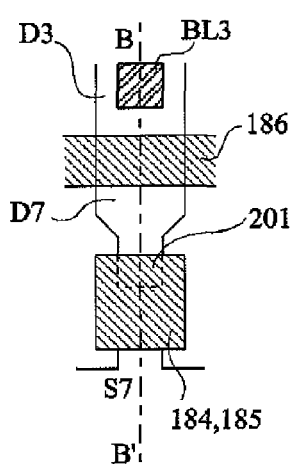 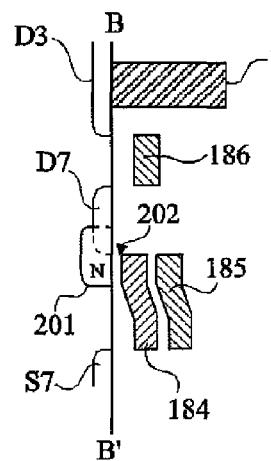 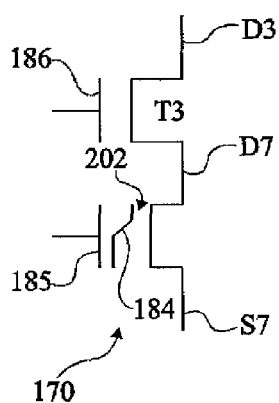
Fig 15A     Fig 15B     Fig 15C

PROTECTION OF INFORMATION CONTAINED IN AN ELECTRONIC CIRCUIT

CROSS REFERENCE TO RELATED APPLICATIONS

This application claims the priority benefit of French patent application number 07/52551, filed on Jan. 5, 2007, entitled "Protection Of Information Contained In An Electronic Circuit," which is hereby incorporated by reference to the maximum extent allowable by law.

BACKGROUND OF THE INVENTION

1. Field of the Invention

The present invention generally relates to electronic circuits and, more specifically, to the protection of data contained in an electronic circuit against fraud attempts aiming at reading said data. The data may be digital quantities supposed to remain secret (that is, within the electronic circuit), for example, access codes or passwords, or specific steps of algorithms and, more generally, any digital data this is not supposed to be communicated in an uncontrolled fashion.

The present invention will be described hereafter in relation with an example of application to smart cards, but it more generally applies to any electronic circuit containing data with a controlled circulation, be the circuit on a smart card, isolated, or assembled on an electronic board of a more complex device.

2. Discussion of the Related Art

When an electronic circuit is to manipulate data which are not intended to be communicated in an uncontrolled fashion, it is equipped with software and/or hardware mechanisms of detection and protection against different attack attempts aiming at hacking these data. Among such attacks, some disturb the electronic circuit operation (for example, attacks known as differential fault analysis attacks—DFA) or cut off the electronic circuit power supply.

A problem of conventional protection mechanisms, be they software or hardware, is that it is difficult to make out a fraud attempt from an incidental disturbance. Now, the action to be taken after a malfunction may be different according to whether it is an attack or an incidental malfunction. In the first case, the electronic circuit operation should generally be blocked to avoid the outputting of data supposed to remain confidential. In the second case, it may be desirable to allow a restarting of the circuit.

SUMMARY OF THE INVENTION

The present invention aims at overcoming all or part of the disadvantages of mechanisms for protecting data contained in an electronic circuit.

An embodiment aims at enabling different actions between incidental malfunctions and malfunctions likely to be fraudulent.

An embodiment aims at a solution compatible with current integrated circuit and EEPROM manufacturing technologies.

To achieve all or part of these objects, as well as others, an embodiment of the present invention provides a method for protecting data contained in an electronic circuit against a disturbance of its operation, in which a detection of a disturbance conditions the incrementing or the decrementing of a counter over at least one bit, the counter being automatically reset at the end of a time period independent from the fact that the circuit is or not powered.

According to an embodiment, the counter is made in the form of at least one charge retention circuit comprising at least one first capacitive element exhibiting a leakage through its dielectric space.

According to an embodiment, a switching of a bit of said counter to an active state is caused by an injection or extraction of charges into or from said first capacitive element.

According to an embodiment, a test of the value of said counter is performed before any execution of a process considered as critical as to the data to be protected.

According to an embodiment, said test causes, in case a threshold is exceeded, an action permanently blocking at least the access to said process and, preferably, the circuit operation.

According to an embodiment, said counter is over several bits, the result of said test being directly provided by the state of one of the bits.

According to an embodiment, an incrementing or decrementing of said counter forces the circuit to perform said test.

According to an embodiment, said counter is incremented or decremented before a process considered as critical to the data to be protected, then decremented, respectively incremented, at the end of the process if no disturbance has been detected during the execution of the process.

An embodiment provides an electronic circuit capable of implementing the method and in which the or each charge retention circuit comprises:

at least one first capacitive element having a first electrode connected to a floating node;

at least one second capacitive element having a first electrode connected to said floating node, the second capacitive element having a greater capacitance than the first one; and at least one first transistor with an insulated control terminal connected to said floating node.

According to an embodiment, at least one third capacitive element has a first electrode connected to said floating node and a second electrode connectable to a voltage source.

According to an embodiment, the circuit is implanted in a network of EEPROM-type memory cells, each comprising a selection transistor in series with a floating-gate transistor and in which, on the same row of memory cells where the respective floating gates of the cell transistors are interconnected:

the first capacitive element comprises a first subset of at least one first cell where the thickness of the dielectric of the tunnel window of the floating gate transistor is smaller than that of the other cells;

the second capacitive element comprises a second subset of at least one second cell where the drain and the source of the floating-gate transistor are interconnected;

the third capacitive element comprises a third subset of at least one third cell; and the first transistor comprises a fourth subset of at least one fourth cell having its tunnel window eliminated.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1 shows a smart card of the type to which the present invention applies as an example;

FIG. 2 shows an electronic circuit of the type to which the present invention applies as an example;

FIG. 3 illustrates an attack by interruption of the supply of a smart card;

FIG. 4 very schematically shows in the form of blocks an embodiment of an electronic circuit;

FIG. 5 is a simplified functional diagram of a first phase of the protection method according to an embodiment;

FIG. 6A is a simplified functional diagram of a second phase of the protection method according to an embodiment;

FIG. 6B is a simplified functional diagram of a second phase of the protection method according to another embodiment;

FIGS. 14A, 14B, and 14C respectively are a top view, a cross-section view along a second direction and the equivalent electric diagram of a first element of the circuit of FIGS. 13A to 13C;

FIGS. 15A, 15B, and 15C respectively are a top view, a cross-section view along the second direction, and the equivalent electric diagram of a second element of the circuit of FIGS. 13A to 13C;

DETAILED DESCRIPTION

Figure 7:
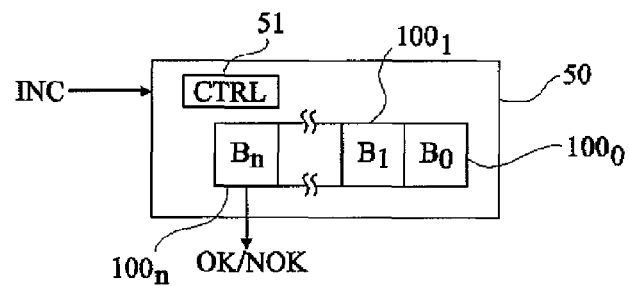
FIG. 7 very schematically shows in the form of blocks an embodiment of an event counter used by the embodiments illustrated in FIGS. 5, 6A and 6B.

The same elements have been designated with the same reference numerals in the different drawings.

For clarity, only those elements and steps which are useful to the understanding of the present invention have been shown in the drawings and will be described hereafter. In particular, the mechanisms of detection of malfunctions of the electronic circuit, be it by fault injection, by cutting-off of the circuit power supply or by any other known detection mechanism have not been detailed. Similarly, the exploitation that is made of the result of a detection of a malfunction considered as fraudulent by means of the present invention has not been detailed either, the present invention being here again compatible with any usual exploitation of this type of detection.

FIG. 1 schematically shows a smart card 1 of the type to which the present invention applies as an example. Such a card is formed of a support, generally made of plastic matter, on or in which are embedded one or several electronic circuits 10. Circuit 10 is capable of communicating with a terminal by means of contacts 2 and/or without contact (radioelectric transmission or by modulation of an electromagnetic field of a terminal).

FIG. 2 very schematically shows in the form of blocks an electronic circuit 10 (for example, of a smart card 1 of FIG. 1) of the type to which the present invention applies as an example. Circuit 10 comprises, among others, a digital processing unit 11 (for example, a central processing unit—CPU), one or several memories 12 (MEM) among which at least one non-volatile memory (for example, of EEPROM type) and one input/output circuit (I/O) 13 to communicate with the outside of the circuit (for connection with contacts 2 or with an antenna). The different elements internal to the circuit communicate together and with interface 13 over one or several data, address, and control buses 14, as well as over possible direct connections between some of these elements. Circuit 10 may also integrate other software or hardware functions. These functions have been symbolized by a block 15 (FCT) in FIG. 2.

FIG. 3 very schematically illustrates in the form of blocks an example of implementation of a so-called attack by cutting-off of the power supply of integrated circuit 10 of a smart card 1.

For example, circuit 10 draws its power supply from a terminal 20, for example, by means of contacts 21 provided in a slot 22 of terminal 20 intended to receive, by introduction, a card 1. Contacts 21 form not only supply contacts but also contacts of data exchange with circuit 10 and are connected to an electronic device 23 of terminal 20, powered by a voltage Valim (for example, by means of a battery or of the electric supply system).

An attack by interruption of the smart card power supply to generate an erroneous behavior thereof for example comprises abruptly removing the card from the slot to interrupt its power supply during the processing. Such a power supply interruption may either be directly used to disturb the card operation or, in more complex mechanisms, be used to avoid a countermeasure from the card aiming, after detection of a fraud attempt, at causing a writing into an EEPROM-type non-volatile memory. Intervening on the power supply at the right time enables avoiding the writing into this memory and may make fault detection countermeasures inefficient.

Other attacks comprise disturbing the operation of electronic circuit 10 thermally, by electromagnetic radiation, by the forced introduction of one or several erroneous values, etc.

A difference between incidental and fraudulent (or at least those whose possible repeating needs to be avoided) malfunctions is their (average) occurrence frequency. In the case of an attack by disturbance of the circuit operation, the person attempting to carry out fraud repeats the disturbance until he obtains the desired data. Further, this repeating is performed within a relatively short time interval so that the attack can be profitable to him. Typically, it can be considered that from a few tens of malfunctions within a time period on the order of one day, it may be a fraudulent behavior of the electronic device or a behavior which, even if it is incidental, is repetitive enough to justify blocking the device.

It could thus be envisaged to count the number of malfunctions of the electronic device within a given time to differentiate incidental malfunctions from fraudulent malfunctions.

However, an electronic circuit is not necessarily permanently powered and, in most cases, does not contain a battery enabling to operate a time counter, so that such a time measurement can be a problem. Further, even if it has a battery, said battery is capable of being discharged (intentionally or not). Moreover, in the case of an intentional cut-off of the power supply (for example, by extraction of the card from its reader), the event counter which could be stored in a reprogrammable non-volatile memory is difficult to update.

FIG. 4 very schematically shows in the form of blocks, in a view to be compared with that of FIG. 2, an embodiment of an electronic circuit 10'.

As previously, circuit 10' comprises a central processing unit 11 (CPU) likely to control its operation, be it in hardware and/or in software fashion, one or several memories 12 (MEM) among which at least one reprogrammable non-volatile memory, one input/output circuit 13 (I/O), and various hardware and software functions symbolized by a block 15 (FCT) depending on the application.

According to this embodiment, circuit 10' also comprises at least one charge retention circuit 100 (TK) having its charge level varying along time, even when circuit 10' is not powered.

Detailed examples of circuits 100 will be described hereafter in relation with FIG. 8 et seq. For the time being, it should only be noted that a circuit 100 is capable of being programmed or activated (placed in a state arbitrarily designated as 1) by injection or extraction of charges in a capacitive element which exhibits a leakage through its dielectric space, so that its active state disappears (the element switches back to state 0) after a given time, independently from the possible power supply of the circuit.

Such a charge retention circuit is implemented to store at least one state indicative of a suspicious behavior of electronic circuit 10.

FIG. 5 illustrates, in a simplified functional diagram, an embodiment of a first phase of a protection mechanism.

On each reset of electronic circuit 10' (block 31, RESET) or on each starting of a processing considered as critical as to the data that it handles, central processing unit 11 first verifies (block 32, COUNT<TH ?) the state of a counter COUNT against a threshold TH. Counter COUNT represents the number of detected malfunctions stored in the charge retention circuit(s) 100 of circuit 10'.

If the number of malfunctions exceeds the threshold (output N of block 32), the electronic circuit stops (block 33, STOP). As a variation, a countermeasure adapted to a fraudulent behavior is taken. For example, the applications considered as critical to the security of the data that they handle are inaccessible.

As long as threshold TH is not reached by the counter (output Y of block 32), unit 11 allows the started process to carry on (block 34, CONT), typically, it allows the starting of electronic circuit 10' to carry on.

FIG. 6A illustrates, in a simplified functional diagram, a first embodiment of a second phase of the protection mechanism.

For each detection (block 41, DETECT) of a circuit malfunction, counter COUNT is incremented (block 42, COUNT=COUNT+1). The protection mechanism then causes either the stopping (block 43, STOP), or a reset (block 43, RESET) of electronic circuit 10'. It however is not the countermeasure usually provided in case of the detection of a fraud attempt, but a processing obliging the circuit to transit through the phase described in relation with FIG. 5 before any carrying-on of a critical process.

Due to the use of a charge retention circuit with an activated state which disappears after a given time, counter COUNT automatically resets, independently from the power supply of electronic circuit 10'. Accordingly, it is now possible to start a countermeasure dedicated to a behavior supposed to be fraudulent by counting the number of malfunctions over a given period.

In a simplified embodiment, a counter over a single bit is enough to trigger the circuit turning-off. It then is a systematic blocking for a given time period for each malfunction. Since an incidental malfunction is not supposed to occur again with the same frequency, the bit resetting enables a restarting while a new attack will block the circuit again.

In all cases, a possible person attempting to fraud is discouraged by the circuit turning-off for a relatively long time period with respect to the benefit that he is supposed to draw from it.

FIG. 6B illustrates, in a simplified functional diagram, another embodiment of a second phase of the protection mechanism.

This embodiment is more specifically intended for malfunctions capable of preventing an updating of a non-volatile memory, especially an EEPROM. The case in point thus is, for example, to protect against attacks by extraction or more generally attacks where the person attempting fraud monitors the possible detections of his attacks by the circuit to prevent subsequent write operations in the non-volatile memory.

Before or at the beginning (block 41', START) of a process considered as critical as to the handled data, counter COUNT is incremented (block 42, COUNT=COUNT+1). Then, the usual process is implemented (block 45, PROCESS) or carries on with its usual countermeasures detecting attacks. Such countermeasures may check the correct execution of a program (the absence of any interruption, the taking into account of all variables, the passing through given steps, the absence of any data output attempt, the execution time, etc.). In the case where a malfunction is detected, a bit (generally a flag) or an indicator word is updated in a volatile storage element (a register, a RAM address, etc.). In countermeasures activating a writing into the non-volatile memory at the end of the process, this indicator is usually used to condition this writing.

At the end of process 45, the method of FIG. 6B verifies the state of the indicator (block 46, DET=0 ?) and more generally, whether a malfunction has occurred during the execution of process 45. When no malfunction is detected (output Y of block 46), counter COUNT is decremented (block 47, COUNT=COUNT-1). Then, the ordinary course of the application carries on (block 43', CONT). When a malfunction is detected (output N of block 46), update 47 of counter COUNT is not performed and the application carries on directly.

Thus, the consequence of an action of a person attempting to fraud at the end of process 45 to avoid the interpretation of a malfunction detection actually translates as the taking into account of this malfunction. Further, even in case of a power supply cut-off, counter COUNT having been incremented before the critical process, the first phase (FIG. 5) can play its role at the next execution. Process 45 being a process considered as critical, the first phase is indeed preferentially implemented before each execution (before or after update 42).

The two embodiments of the second phase can be combined together and/or with other countermeasures.

FIG. 7 very schematically shows in the form of blocks an example of a counting circuit 50 containing n electronic charge retention circuits $100_0, 100_1, \ldots, 100_n$, each storing a bit $B_0, B_1, B_n$ of counter COUNT. Circuit 50 is preferably controlled by an internal circuit 51 (CTRL) causing, as will be better understood hereafter in relation with FIG. 8 et seq., the counter incrementation after a malfunction has been detected (input INC of block 50), as well as the reading of the state of one or several bits of the counter.

In the example illustrated in FIG. 7, it is assumed that the bit $B_n$ of highest rank defines threshold TH. Indeed, a state switching of this bit represents an overflow with respect to count $2^{n-1}-1$. The reading of this single bit is then enough to provide a signal OK/NOK indicative of the result of test 32 (FIG. 5).

An advantage of such a comparison by overflow is that it makes a same hardware embodiment of circuit 50 versatile. Indeed, threshold TH can then be easily adapted whatever the number of structural bits of counter 50 by selecting that of the counter bits to be taken into account to provide result OK/NOK of test 32.

Different thresholds may be selected according to the detected alarm type. For example, if it is an unexpected operation sequence (most likely to be also incidental), a blocking of relatively short duration (for example, a few hours may be enough). However, if it is a card reset detection (by cutting-off of its power supply), a duration on the order of one week may then be provided to discourage a possible person attempting fraud.

An advantage is to dissociate incidental malfunctions from fraudulent malfunctions of an integrated circuit and take the adapted measures.

Another advantage is the compatibility with any malfunction detection mode, including when this detection is itself detected by the person attempting fraud who then cuts-off the power supply to avoid a countermeasure.

In the case of a counter over several bits, the discussed solution is compatible with usual countermeasures (for example, a definitive blocking) of the electronic circuit. Only the triggering of this countermeasure is then postponed to the exceeding of threshold TH, thus enabling to dissociate incidental malfunctions from fraudulent malfunctions (or malfunctions repetitive enough to consider it preferable to block the circuit).

Figure 8:
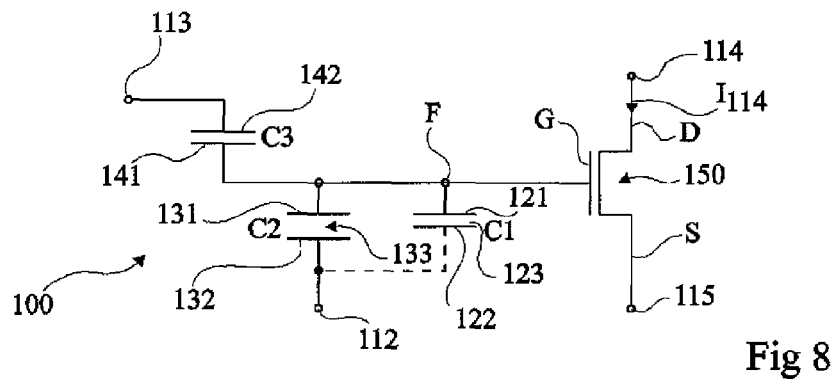
FIG. 8 shows an embodiment of an electronic charge retention circuit.

FIG. 8 shows a preferred example of a charge retention circuit 100.

Circuit 100 comprises a first capacitive element C1 having a first electrode 121 connected to a floating node F and having its dielectric space 123 designed (by its permittivity and/or by its thickness) to exhibit non-negligible leakages along time. "Floating node F" is used to designate a node not directly connected to any diffused region of the semiconductor substrate in which circuit 100 (and circuit 10') is preferentially formed and, more specifically, separated by a dielectric space from any voltage-application terminal. Second electrode 122 of capacitive element C1 is either connected (dotted lines in FIG. 2) to a terminal 112 intended to be connected to a reference voltage (for example, the ground), or left floating.

A second capacitive element C2 has its first electrode 131 connected to node F and a second electrode 132 connected to terminal 112. Capacitive element C2 exhibits a charge retention capacitance greater than that of capacitive element C1.

Preferably, a third capacitive element C3 has a first electrode 141 connected to node F and a second electrode 142 connected to a terminal 113 of circuit 100, intended to be connected to a supply source on initialization of a charge retention phase (activation of the stored bit to state 1).

A function of capacitive element C2 is to store an electric charge. A function of capacitive element C1 is to discharge relatively slowly storage element C2 (as compared with a direct connection of its electrode 131 to ground) due to a leakage through its dielectric space. The presence of capacitive element C2 enables dissociating the charge level present in circuit 100 from the discharge element (capacitance C1). The thickness of the dielectric of element C2 is greater than that of element C1. The capacitance of element C2 is greater, preferably by a ratio of at least 10, than that of element C2.

A function of capacitive element C3 is to enable a charge injection into capacitive element C2 by Fowler-Nordheim effect or by a hot electron injection phenomenon. Element C3 enables avoiding the stress on element C1 on charge of elements C2 and C1 in parallel. The thickness of the dielectric space of element C3 is greater than that of element C1, to avoid introducing a parasitic leakage path.

Node F is connected to a gate G of a transistor with an insulated control terminal (for example, a MOS transistor 150) having its conduction terminals (drain D and source S) connected to output terminals 114 and 115 to measure the residual charge contained in element C2 (neglecting the capacitance of capacitive element C1 in parallel). For example, terminal 115 is grounded and terminal 114 is connected to a current source (not shown) enabling the current-to-voltage conversion of drain current $I_{114}$ in transistor 150.

The thickness of the gate dielectric of transistor 150 is greater than that of the dielectric of capacitive element C1 to avoid introducing an additional leakage on node F. Preferably, the gate thickness of transistor 150 is even greater than the thickness of the dielectric of capacitive element C3, to avoid introducing a parasitic programming path (of injection or extraction of charges into or from node F).

The interpretation of the stored level can be performed simply by means of a comparator, the switching of which is performed as long as the charge of node F remains sufficient. The level for which the comparator switches then defines the state-switching level of the bit stored by element 100. Other read solutions may be envisaged, for example, a multiple-level interpretation in an embodiment where circuit 100 directly stores several bits.

Figure 9:
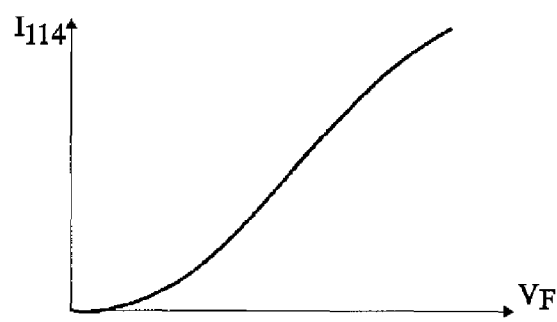
FIG. 9 is a current-vs.-voltage plot illustrating the operation of the circuit of FIG. 8.

FIG. 9 shows an example of the shape of drain current $I_{114}$ of transistor 150 according to voltage $V_F$ at node F, referenced with respect to terminal 115. Voltage $V_F$ then expresses the gate-source voltage of transistor 150. It depends on the residual charge across capacitive elements C1 and C2 in parallel, and thus essentially on the residual charge in capacitive element C2. The evaluation of drain current $I_{114}$ may be performed by maintaining terminals 112 and 115 at the same voltage (for example, the ground) and by applying a known voltage on terminal 114.

Figure 10:
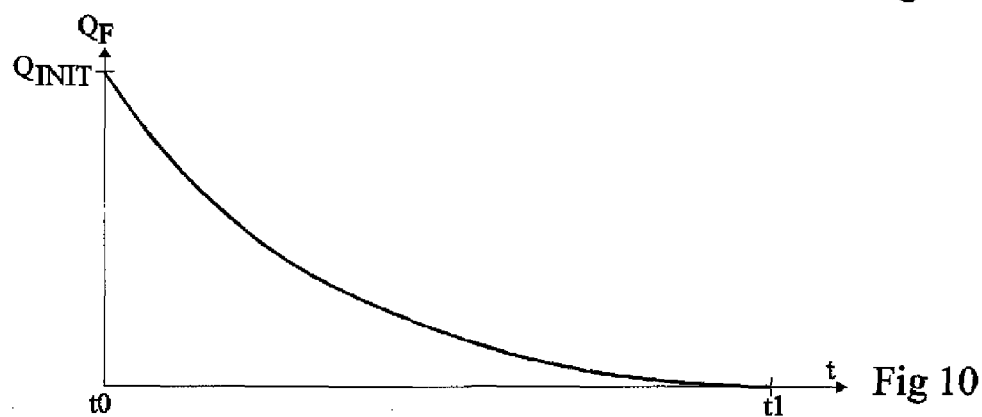
FIG. 10 is a timing diagram illustrating the operation of the circuit of FIG. 8.

FIG. 10 illustrates the variation of charge $Q_F$ at node F along time. At a time t0 when a supply (programming) voltage stops being applied on terminal 113, charge $Q_F$ starts from an initial value $Q_{INIT}$ to cancel at a time t1 with a capacitive discharge variation. The time interval between times t0 and t1 not only depends on the leakage capacitance of the dielectric of capacitive element C1, but also on the value (and thus on the storage capacitance) of capacitive element C2 which conditions value $Q_{INIT}$.

Assuming that terminals 112 and 115 and second electrode 122 of capacitive element C1 are at reference voltages and that terminal 114 is biased to a level determined so that a variation of current $I_{114}$ only originates from a variation of the voltage at node F, this variation then only depends on the time elapsed since time t0. This result is, in the shown embodiment, obtained due to the dissociation performed between the time leakage element (C1) and the element representative of the residual charge (C2).

The programming or activation of circuit 100 (switching to state 1 of the stored bit) through capacitive element C3 protects capacitive element C1 which has a relatively thin oxide (dielectric) thickness, which would otherwise risk being damaged in the programming. This especially enables making the measurements reliable and reproducible along time.

Several capacitive elements C3 are connected in parallel between terminal 113 and node F to accelerate the programming time.

Similarly, the retention time may be adapted not only by setting the thicknesses and/or the permittivities of the dielectrics of capacitive elements C1 and C2, but also by providing several capacitive elements C1 and/or C2 in parallel.

Figure 11:
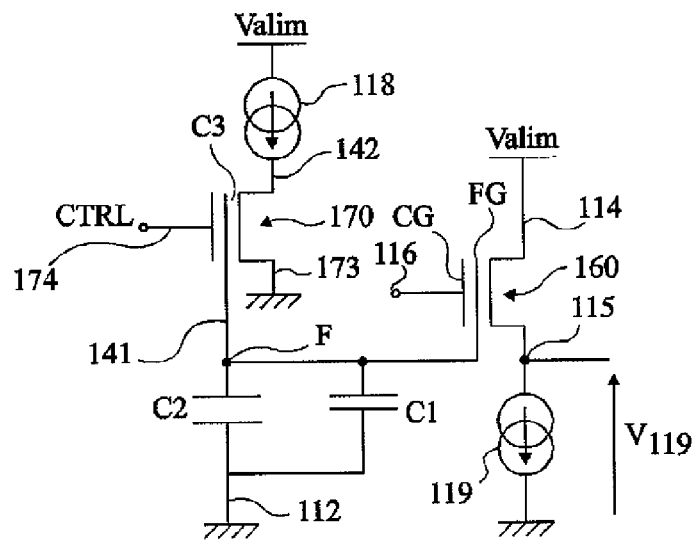
FIG. 11 shows another embodiment of a charge retention circuit in an example of environment.

FIG. 11 shows the electric diagram of another embodiment of a charge retention circuit 100'.

As compared with the embodiment of FIG. 8, transistor 150 is replaced with a transistor 160 with a floating gate FG connected to node F. Control gate CG of transistor 160 is connected to a terminal 116 for controlling the reading of the residual charge in circuit 100' (and thus of the state of the stored bit). The dielectric thickness, between floating gate FG and the channel (active area) of transistor 160, is greater than that of capacitive element C1 and preferentially greater than that of capacitive element C3.

Another difference is that charge injection or extraction capacitive element C3 is a floating-gate MOS transistor 170. Floating gate 141 of transistor 170 is connected to node F.

In the example of FIG. 11, the circuit has been shown in part of its environment. Drain 142 of transistor 170 is connected to a current source 118 receiving a supply voltage Valim and its source 173 is grounded. Its control gate 174 receives a control signal CTRL intended to turn on transistor 170 when charges need be injected. The drain (terminal 114) of transistor 160 receives supply voltage Valim and its source is grounded by a current source 119 (inverted variation with respect to the embodiment described in relation with FIG. 8). Voltage $V_{119}$ across current source 119 is representative of the voltage at node F and is used to switch the output of a comparator (not shown).

Figure 12:
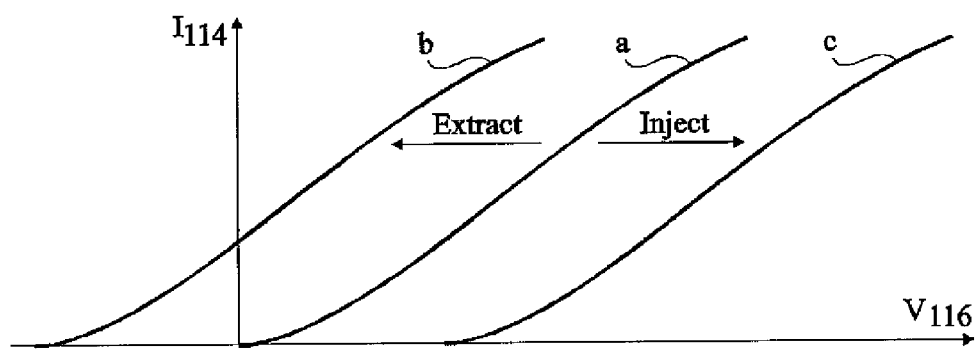
FIG. 12 is a current-vs.-voltage plot illustrating the operation of the circuit of FIG. 11.

FIG. 12 illustrates, in a plot of current $I_{114}$ versus voltage $V_{116}$ applied on the control gate, the operation of the circuit of FIG. 11. For explanation needs, it is assumed that the voltage between drain terminal 114 and source terminal 115 of transistor 160 is maintained constant by the external read circuit. The voltage drop between the floating gate and terminal 115 then depends on the electric charge present at node F, on the total capacitance between nodes F and 112 (essentially capacitive elements C1 and C2), and on the voltage applied on control gate 116 of transistor 160. In FIG. 12, three curves a, b, and c have been illustrated. Curve a shows the case where node F is fully discharged. Curve b shows the case of a positive charge present on node F (electron extraction). The threshold of transistor 160 is then lowered. Curve c shows the case of a negative charge on node F (electron injection), which generates a higher threshold for MOS transistor 160.

According to the applications, charges may be injected onto or extracted from node F to modify the characteristic of transistor 160 from curve a to one of curves b and c. Once isolated from the programming voltage, the leakage of capacitive element C1 enables returning along time to curve a. A measurement of current $I_{114}$ (and thus of voltage $V_{119}$) for a zero voltage $V_{116}$ enables detecting an expiry of the time (resetting of the bit to zero) when current $I_{114}$ becomes zero.

After, an extraction of electrons (application on terminal 113 of an activation or programming voltage positive with respect to terminal 112) by Fowler-Nordheim effect is assumed. The operation which will be described however easily transposes to an injection of electrons at node F, for example, by a so-called hot carrier phenomenon by applying adapted voltages between terminals 142, 173, and 174.

Different voltages may be used in programming and in read mode provided to have an exploitable reference between the residual charge and the interpretation of the state of the stored bit.

According to a specific example of embodiment, a charge retention circuit is formed with the following values:

Capacitance C1: 2 fF, dielectric thickness: 40 Å;
Capacitance C2: 20 fF, dielectric thickness: 160 Å;
Capacitance C3: 1 fF, dielectric thickness: 80 Å.

Such a circuit can be reset by application of a voltage on the order of 12 volts and is discharged after approximately one week. It is of course an example only, the dielectric thicknesses and the possible parallel association of several capacitive elements C1 or C2 conditioning the charge retention time.

FIGS. 13A, 13B, 13C, 14A, 14B, 14C, 15A, 15B, 15C, 16A, 16B, 16C, 17A, 17B, and 17C show an example of a circuit 100' according to the embodiment of FIG. 11 in an integrated structure, derived from an EEPROM memory architecture.

Figure 13A:
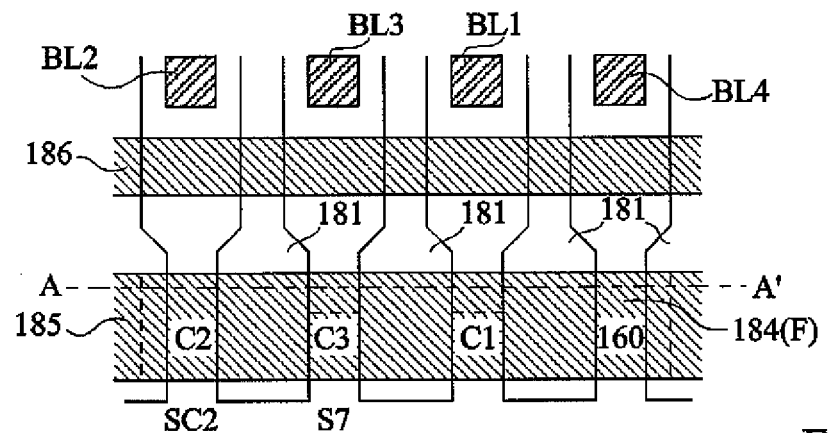
FIGS. 13A, 13B, and 13C respectively are a top view, a cross-section view along a first direction and the equivalent electric diagram of an embodiment of an electronic charge retention circuit based on EEPROM cells.
Figure 13B:
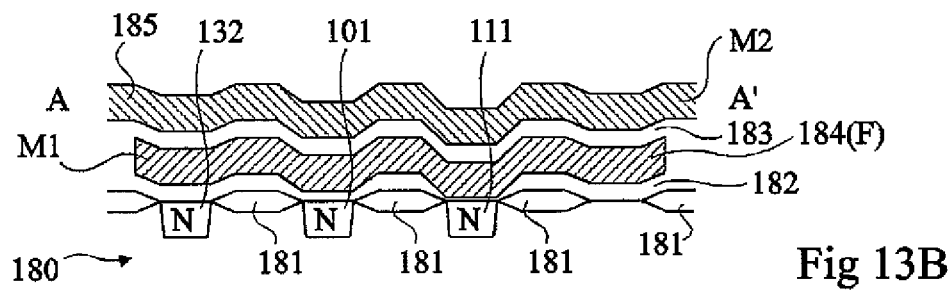
Figure 13C:
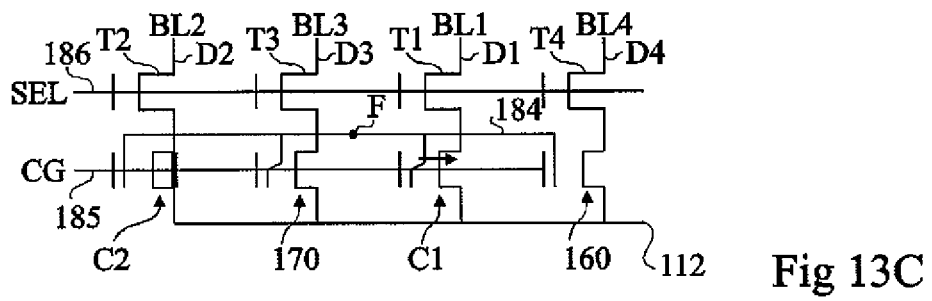

FIGS. 13A, 14A, 15A, 16A, and 17A are simplified top views, respectively, of the electronic charge retention circuit and of its elements C2, 170, C1, and 160. FIG. 13B is a cross-section view along line AA' of FIG. 13A. FIGS. 14B, 15B, 16B, and 17B respectively are cross-section views along lines BB' of FIGS. 14A, 15A, 16A, and 17A. FIGS. 13C, 14C, 15C, 16C, and 17C show the respective equivalent electric diagrams of the electronic charge retention circuit and of its elements C2, 170, C1, and 160.

An embodiment with N-channel transistors in a P-type silicon substrate 180 (FIG. 13B) is assumed. The inverse is of course possible.

Each element or cell C2, 170, C1, or 160 is obtained from a floating-gate transistor series-connected with a single-gate selection transistor T2, T3, T1, or T4 to select, for example from an EEPROM cell array network, the electronic charge retention circuit.

The floating gates of the different transistors forming elements C2, 170, C1, and 160 are interconnected (conductive line 184) to form floating node F. Their control gates are connected together to a conductive line 185 for applying read control signal CG. Their respective sources SC2, S7, SC1, and S6 are interconnected to terminal 112 (the ground) and their respective drains DC2, D7, DC1, and D6 are connected to the respective sources of selection transistors T2, T3, T1, and T4.

The gates of transistors T1 to T4 are connected together to a conductive line 186 of application of a selection signal SEL of the circuit. Their respective drains D1 to D4 are connected to individually-controllable bit lines BL1 to BL4. The order of the bit lines in FIG. 13C has been arbitrarily illustrated as BL2, BL3, BL1, and BL4 but the order of the different elements C2, 170, C1, and 160 in the horizontal direction of the rows (in the orientation of the drawings) is indifferent.

In this example of embodiment, N-type source and drain regions separated from one another in the line direction by insulating areas 181 are assumed (FIG. 13B). The floating gates are formed in a first conductive level M1 separated from the active regions by an insulating level 182 and the control gates are formed in a second conductive level M2 separated from the first one by a third insulating level 183. The gates of the selection transistors are formed, for example, in level M2.

A difference with respect to a usual EEPROM cell network is that the floating gates are interconnected by groups of four transistors to form floating node F. Another difference is that the floating-gate transistors forming the different circuit elements differ from one another by the thickness of their tunnel window and/or their drain and source connection.

FIGS. 14A to 14C illustrate the forming of storage capacitor C2. Drain DC2 and source SC2 of the corresponding floating-gate transistor are short-circuited (by extension of the $N^+$-type implantation across the entire active area, FIG.

14B) to form electrode 132 of the capacitor. Further, the tunnel window is eliminated with respect to a standard EEPROM cell.

FIGS. 15A to 15C illustrate the forming of transistor 170 forming capacitive programming element C3. It is a standard EEPROM cell in which the extension 201 of the N doped area under tunnel window 202 (FIG. 15B) provides a platform in the charge injection area. Like a standard EEPROM cell, drain area D7 is connected to the source of selection transistor T3. Source area S7 is connected to terminal 112.

Figure 16A:
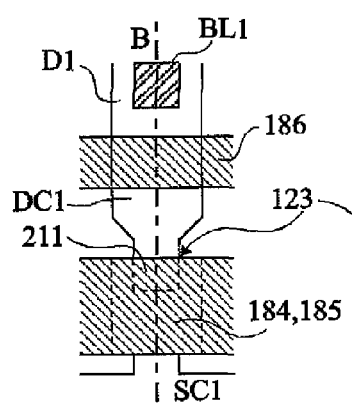
FIGS. 16A, 16B, and 16C respectively are a top view, a cross-section view along the second direction, and the equivalent electric diagram of a third element of the circuit of FIGS. 13A to 13C.
Figure 16B:
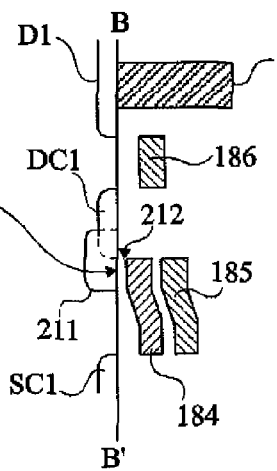
Figure 16C:
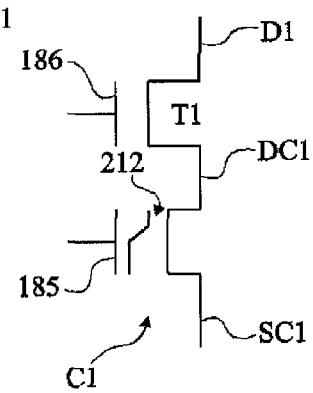

FIGS. 16A to 16C illustrate the forming of capacitive element C1 forming the leakage element of the charge retention circuit. As compared with a standard EEPROM cell, a difference is the thinning (area 212, FIG. 16B) of the dielectric window used for the tunnel effect to increase leakages. For example, dielectric thickness 212 is selected to be approximately half (for example, between 30 and 40 angströms) that (for example, between 70 and 80 angströms) of a tunnel window (202, FIG. 15B) of an unmodified cell.

Figure 17A:
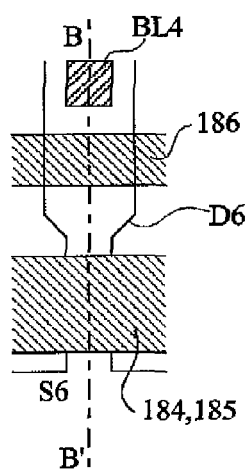
FIGS. 17A, 17B, and 17C respectively are a top view, a cross-section view along the second direction, and the equivalent electric diagram of a fourth element of the circuit of FIGS. 13A to 13C.
Figure 17B:
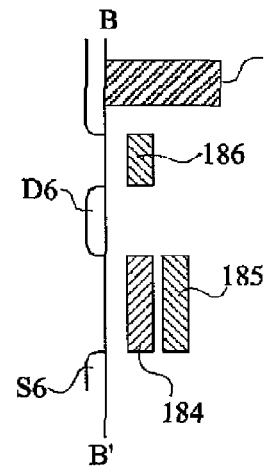
Figure 17C:
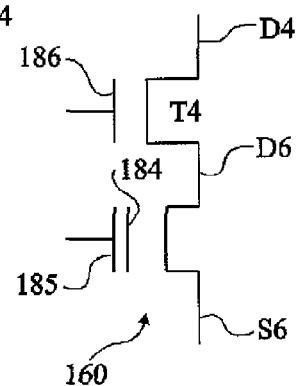

FIGS. 17A to 17C illustrate the forming of read transistor 160 in which the tunnel window has been eliminated as well as, preferably, the usual implanted area (201, FIG. 15B) of an EEPROM cell. The active area limited by source S6 and drain D6 is thus similar to that of a normal MOS transistor.

The representations of FIGS. 13A to 17C are simplified and may be adapted to the technology used. In particular, the gates have been shown as aligned with the limits of the drain and source areas, but a slight overlapping is often present.

An advantage of the embodiment by means of an EEPROM cell technology is that the charge retention circuit may be programmed and reset by applying the same voltage levels and the same time windows as those used to erase or write into EEPROM cells.

Another advantage is that this preserves a stability along time by avoiding the degradations of the thin oxide of the leakage element (C1) in successive write operations.

The respective connections of bit lines BL1 to BL4 depend on the circuit operating phases and especially on the programming (activation) or read phase.

Table I hereabove illustrates an embodiment of an activation (SET) and of a reading (READ) of an electronic charge retention circuit such as illustrated in FIGS. 13A to 17C.

TABLE I

|  | SEL | CG | BL2 | BL3 | BL1 | BL4 | 112 |
| --- | --- | --- | --- | --- | --- | --- | --- |
| SET | $VPP_1$ | 0 | HZ | $VPP_2$ | HZ | HZ | HZ |
| READ | $V_{SEL}$ | $V_{READ}$ | HZ | HZ | HZ | $V_{114}$ | 0 |

In an activation phase SET (switching of the stored bit to state 1), selection signal SEL is brought to a first high voltage $VPP_1$ with respect to ground to turn on the different transistors T1 to T4 while signal CG applied on the control gates of the floating-gate transistors remains at low level 0 to avoid turning on transistor 160. Bit lines BL1, BL2, and BL4 remain floating (high-impedance state HZ) while bit line BL3 is applied a positive voltage $V_{PP2}$ enabling charge of floating node F. Line 112, common to the sources of the floating-gate transistors, is preferentially left floating HZ.

For reading READ, the different selection transistors are set by signal SEL to a level $V_{SEL}$ and a read voltage $V_{READ}$ is applied on the control gates of the different floating-gate transistors. Lines BL1, BL2, and BL3 are in a high impedance state HZ while line BL4 receives a voltage $V_{114}$ enabling supplying the read current source. Line 112 is here grounded.

The relations between the different levels $VPP_1$, $VPP_2$, $V_{SEL}$, $V_{READ}$, and $V_{114}$ are, preferably, the following:
  $VPP_1$ greater than $VPP_2$;
  $V_{SEL}$ greater than $V_{READ}$;
  $V_{READ}$ on the same order of magnitude as $V_{114}$.
According to a specific example of embodiment:
  $VPP_1$=14 volts;
  $VPP_2$=12 volt;
  $V_{SEL}$=4 volts;
  $V_{READ}$=2 volts; and
  $V_{114}$=1 volts.

What has been described hereabove in relation with one EEPROM cell per element of the charge retention circuit may of course be replaced with a structure in which subsets of several identical cells in parallel are used for the different respective elements. In particular:
  several elements C2 may be used in parallel to increase the capacitance of node F to increase the electronic circuit discharge time;
  several elements 170 may be used in parallel to increase the electron injection or extraction speed at node F in a programming;
  several leakage elements C1 may be used in parallel to decrease the system discharge time; and/or
  several read elements 160 may be introduced in parallel to provide a greater current on evaluation of the circuit.

An electronic charge retention circuit may be introduced in any position of a standard network of EEPROM cells, which enables making it more difficult to locate by a possible evil-disposed user.

The cell-selection transistors forming the charge retention transistors may be shared with normal EEPROM cells on the same bit lines, by providing adapted addressing and switching means.

Of course, the present invention is likely to have various alterations, modifications, and improvements which will readily occur to those skilled in the art. In particular, the charge retention circuit may be formed by any circuit likely to exhibit, in reproducible fashion, a charge loss along time independently from the circuit power supply. For example, a circuit such as described in International patent application WO-A-03/083769 may be used.

Further, the practical forming of the circuit based on the functional indications given hereabove and on the needs of the application is within the abilities of those skilled in the art. The counters may be of any nature and the counting function may be of any increment or decrement. For example (especially in embodiments, for example FIG. 8 et seq., where the counting cells cannot be reset otherwise than by time), two incremental counters of finite size, the difference of which provides the value to be considered, may be used.

Moreover, especially as it requires no permanent power supply, the present invention may be implemented in contactless devices (of electromagnetic transponder type) which draw their power supply from an electromagnetic field in which they are present (generated by a terminal).

Finally, all that has been described in relation with a counter increment easily transposes to a counter decrement for each detection.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for protecting data contained in an electronic circuit against a disturbance of its operation, wherein a detection of a disturbance conditions the incrementing or the decrementing of a counter over at least one bit, the counter being automatically reset at the end of a time period independent from the fact that the circuit is or not powered, and the counter being made in the form of at least one charge retention circuit comprising at least one first capacitive element exhibiting a leakage through its dielectric space, the leakage discharging the first capacitive element to an inactive state at the end of the time period, wherein a switching of a bit of said counter to an active state is caused by an injection or extraction of charges into or from said first capacitive element, and wherein the at least one charge retention circuit comprises:

the at least one first capacitive element having a first electrode connected to a floating node;

at least one second capacitive element having a first electrode connected to said floating node, the second capacitive element having a greater capacitance than the first one; and at least one first transistor with an insulated control terminal connected to said floating node.

2. The method of claim 1, wherein a test of the value of said counter is performed before any execution of a process considered as critical as to the data to be protected.

3. The method of claim 2, wherein said test causes, in case a threshold is exceeded, an action permanently blocking at least the access to said process and, preferably, the circuit operation.

4. The method of claim 2, wherein said counter is over several bits, the result of said test being directly provided by the state of one of the bits.

5. The method of claim 2, wherein an incrementing or decrementing of said counter forces the circuit to perform said test.

6. The method of claim 1, wherein said counter is incremented or decremented before a process considered as critical to the data to be protected, then decremented, respectively incremented, at the end of the process if no disturbance has been detected during the execution of the process.

7. An electronic circuit comprising a processor and a memory configured to implement a method for protecting data contained in an electronic circuit against a disturbance of its operation, wherein a detection of a disturbance conditions the incrementing or the decrementing of a counter over at least one bit, the counter being automatically reset at the end of a time period independent from the fact that the circuit is or not powered, and the counter being made in the form of at least one charge retention circuit comprising at least one first capacitive element exhibiting a leakage through its dielectric space, wherein a switching of a bit of said counter to an active state is caused by an injection or extraction of charges into or from said first capacitive element, and wherein the at least one charge retention circuit comprises:

the at least one first capacitive element having a first electrode connected to a floating node;

at least one second capacitive element having a first electrode connected to said floating node, the second capacitive element having a greater capacitance than the first one; and at least one first transistor with an insulated control terminal connected to said floating node.

8. The circuit of claim 7, wherein at least one third capacitive element has a first electrode connected to said floating node and a second electrode connectable to a voltage source.

9. The circuit of claim 8, implanted in a network of EEPROM-type memory cells, each comprising a selection transistor in series with a floating-gate transistor and in which, on a same row of memory cells where the respective floating gates of the cell transistors are interconnected:

the first capacitive element comprises a first subset of at least one first cell where the thickness of the dielectric of the tunnel window of the floating gate transistor is smaller than that of the other cells;

the second capacitive element comprises a second subset of at least one second cell where the drain and the source of the floating-gate transistor are interconnected;

the third capacitive element comprises a third subset of at least one third cell; and the first transistor comprises a fourth subset of at least one fourth cell having its tunnel window eliminated.

10. A method for protecting data contained in an electronic circuit against a disturbance, comprising:

incrementing or decrementing a counter in response to detection of a disturbance to the electronic circuit, the counter comprising at least one charge retention circuit including at least one first capacitive element having a leakage that discharges the first capacitive element to an inactive state at the end of a time period that is independent of whether power is applied to the electronic circuit;

initiating a countermeasure to the disturbance in response to a value of the counter reaching a threshold; and enabling operation of the electronic circuit in response to the charge retention circuit automatically resetting to the inactive state at the end of the time period, wherein the at least one first capacitive element has a first electrode connected to a floating node and wherein the at least one charge retention circuit further comprises at least one second capacitive element having a first electrode connected to the floating node, the second capacitive element having a larger capacitance and a smaller leakage than the first capacitive element, and a measurement circuit connected to the floating node to measure a residual charge of the floating node.

11. A method as defined in claim 10, wherein incrementing or decrementing the counter comprises switching a bit of the counter to an active state by injection or extraction of charges into or from the first capacitive element.

12. A method as defined in claim 10, further comprising testing the value of the counter before execution of a process considered as critical to the data to be protected.

13. A method as defined in claim 12, wherein initiating the countermeasure comprises blocking access to the process.

14. A method as defined in claim 12, wherein the counter includes several bits and a result of the testing is provided by the state of one of the bits of the counter.

15. A method as defined in claim 12, wherein incrementing or decrementing the counter causes testing of the value of the counter.

16. A method as defined in claim 10, wherein incrementing or decrementing the counter comprises incrementing or decrementing the counter before a process considered as critical to the data to be protected and then decrementing or incrementing the counter, respectively, at the end of the process if a disturbance has not been detected during execution of the process.

17. An electronic circuit comprising:

a counter comprising at least one charge retention circuit including at least one first capacitive element having a leakage that discharges the first capacitive element to an inactive state at the end of a time period that is independent of whether power is applied to the electronic circuit; and a controller configured to:
increment or decrement the counter in response to detection of a disturbance to the electronic circuit;
initiate a countermeasure to the disturbance in response to a value of the counter reaching a threshold; and
enable operation of the electronic circuit in response to the charge retention circuit automatically resetting to the inactive state at the end of the time period, wherein the at least one first capacitive element has a first electrode connected to a floating node, and wherein the at least one charge retention circuit further comprises at least one second capacitive element having a first electrode connected to the floating node, the second capacitive element having a larger capacitance and a smaller leakage than the first capacitive element, and a measurement circuit connected to the floating node to measure a residual charge of the floating node.

18. An electronic circuit as defined in claim 17, wherein the counter is configured for switching of a bit to an active state by injection or extraction of charges into or from the first capacitive element.

19. An electronic circuit as defined in claim 17, wherein the at least one charge retention circuit further comprises at least one third capacitive element having a first electrode connected to the floating node and a second electrode connectable to a voltage source.

20. An electronic circuit as defined in claim 17, wherein the measurement circuit includes a floating gate transistor having a floating gate connected to the floating node.

21. An electronic circuit as defined in claim 17, wherein the controller is configured to test a value of the counter before execution of a process considered as critical to the data to be protected.

22. An electronic circuit as defined in claim 21, wherein the counter has several bits and a result of the test is provided by a state of one of the bits of the counter.

23. An electronic circuit as defined in claim 17, wherein the controller is configured to increment or decrement the counter before a process considered as critical to the data to be protected and to decrement or increment the counter, respectively, at the end of the process if a disturbance has not been detected during execution of the process.

* * * * *